US012070936B2

(12) United States Patent
Abe et al.

(10) Patent No.: US 12,070,936 B2
(45) Date of Patent: Aug. 27, 2024

(54) IMAGE RECORDING APPARATUS WITH HEATING OF RECORDING MEDIUM ON WHICH RECORDING HAS BEEN PERFORMED AND WITH BRANCHED CONVEYING PATH

(71) Applicant: CANON KABUSHIKI KAISHA, Tokyo (JP)

(72) Inventors: Takashi Abe, Kanagawa (JP); Tetsuya Ishikawa, Kanagawa (JP); Tsuyoshi Saeki, Kanagawa (JP); Yoshiyuki Kurita, Saitama (JP); Yumi Mukoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 17/336,426

(22) Filed: Jun. 2, 2021

(65) Prior Publication Data

US 2021/0379909 A1 Dec. 9, 2021

(30) Foreign Application Priority Data

Jun. 9, 2020 (JP) ................................ 2020-100439

(51) Int. Cl.

*B41J 11/00* (2006.01)
*B41J 13/00* (2006.01)
*B41J 13/10* (2006.01)

(52) U.S. Cl.

CPC .......... *B41J 11/0024* (2021.01); *B41J 11/002* (2013.01); *B41J 11/0022* (2021.01); (Continued)

(58) Field of Classification Search

CPC ... B41J 11/0024; B41J 11/002; B41J 11/0022; B41J 11/007; B41J 13/0036; B41J 13/009; B41J 13/103

See application file for complete search history.

(56) References Cited

U.S. PATENT DOCUMENTS

| | | | |
|---|---|---|---|
| 4,684,962 | A | 8/1987 | Hirosawa et al. |
| 4,698,650 | A | 10/1987 | Watanabe et al. |

(Continued)

FOREIGN PATENT DOCUMENTS

| | | | |
|---|---|---|---|
| JP | 2003-080692 | A | 3/2003 |
| JP | 2009-066905 | A | 4/2009 |

(Continued)

OTHER PUBLICATIONS

Feb. 27, 2024 Japanese Official Action in Japanese Patent Appln. No. 2020-100439.

(Continued)

*Primary Examiner* — Henok D Legesse

(74) *Attorney, Agent, or Firm* — Venable LLP

(57) ABSTRACT

An image recording apparatus includes a recording unit that records an image on a recording medium, a discharge unit configured to discharge the recording medium on which recording has been performed by the recording unit, a first conveying path for conveying the recording medium from the recording unit to the discharge unit, a heating unit configured to heat the recording medium on which recording has been performed by the recording unit and disposed on the first conveying path, and a second conveying path configured to branch off from the first conveying path at a branching portion between the heating unit and the discharge unit and configured to merge with the first conveying path between the recording unit and a stacking unit on the first conveying path.

21 Claims, 11 Drawing Sheets

(52) U.S. Cl.
CPC ......... *B41J 11/007* (2013.01); *B41J 13/0036* (2013.01); *B41J 13/009* (2013.01); *B41J 13/103* (2013.01)

(56) References Cited

U.S. PATENT DOCUMENTS

| | | | | |
|---|---|---|---|---|
| 5,019,840 | A | 5/1991 | Watanabe et al. | |
| 5,311,214 | A | 5/1994 | Hirasawa et al. | |
| 5,339,098 | A | 8/1994 | Nagatomo et al. | |
| 5,548,308 | A | 8/1996 | Nagatomo et al. | |
| 5,971,525 | A | 10/1999 | Inoue et al. | |
| 6,142,599 | A | 11/2000 | Ishinaga et al. | |
| 6,151,051 | A | 11/2000 | Ikeda et al. | |
| 6,196,655 | B1 | 3/2001 | Hirasawa et al. | |
| 6,435,675 | B2 | 8/2002 | Okura et al. | |
| 7,048,356 | B2 | 5/2006 | Ishikawa et al. | |
| 7,226,157 | B2 | 6/2007 | Nakazawa et al. | |
| 7,661,786 | B2 | 2/2010 | Nakazawa et al. | |
| 7,866,789 | B2 | 1/2011 | Shigeno et al. | |
| 8,029,126 | B2 | 10/2011 | Imoto | |
| 8,220,797 | B2 | 7/2012 | Yamamoto | |
| 8,262,216 | B2 | 9/2012 | Hamano et al. | |
| 8,348,401 | B2 | 1/2013 | Sekino et al. | |
| 8,443,985 | B2 | 5/2013 | Aoyama et al. | |
| 8,602,538 | B2 | 12/2013 | Sekino et al. | |
| 8,651,638 | B2 | 2/2014 | Ishikawa | |
| 8,876,280 | B2 | 11/2014 | Ishikawa et al. | |
| 8,955,958 | B2 | 2/2015 | Itogawa | |
| 9,004,640 | B2 | 4/2015 | Ishikawa et al. | |
| 9,415,960 | B2 | 8/2016 | Asano et al. | |
| 9,703,249 | B2 | 7/2017 | Uchida | |
| 10,406,838 | B2 | 9/2019 | Ohashi et al. | |
| 10,596,820 | B2 | 3/2020 | Abe et al. | |
| 10,632,758 | B2 | 4/2020 | Kosuge et al. | |
| 10,723,153 | B2 | 7/2020 | Ohashi et al. | |
| 10,766,265 | B2 | 9/2020 | Tokisawa et al. | |
| 10,843,480 | B2 | 11/2020 | Arai et al. | |
| 10,960,678 | B2 | 3/2021 | Kosuge et al. | |
| 10,974,527 | B2 | 4/2021 | Ohashi et al. | |
| 11,040,551 | B2 | 6/2021 | Mizushima | |
| 11,897,255 | B2 | 2/2024 | Mizushima | |
| 2009/0073211 | A1 | 3/2009 | Imoto | |
| 2010/0078877 | A1 | 4/2010 | Yamamoto | |
| 2011/0044704 | A1* | 2/2011 | Uehara | G03G 21/1633 399/21 |
| 2011/0090271 | A1 | 4/2011 | Shigeno et al. | |
| 2011/0148972 | A1 | 6/2011 | Hara | |
| 2013/0257959 | A1 | 10/2013 | Itogawa | |
| 2015/0070452 | A1* | 3/2015 | Motoyanagi | B41J 11/00216 347/102 |
| 2015/0158311 | A1* | 6/2015 | Ogasawara | B41J 11/00216 347/16 |
| 2016/0070213 | A1* | 3/2016 | Arima | B41M 7/0009 399/69 |
| 2016/0238972 | A1 | 8/2016 | Uchida | |
| 2018/0236791 | A1 | 8/2018 | Ohashi et al. | |
| 2018/0272752 | A1 | 9/2018 | Shibata et al. | |
| 2018/0311960 | A1* | 11/2018 | Nakai | B41J 2/16538 |
| 2019/0193426 | A1 | 6/2019 | Mizushima | |
| 2020/0180320 | A1 | 6/2020 | Abe et al. | |
| 2020/0316967 | A1 | 10/2020 | Ohashi et al. | |
| 2021/0178777 | A1 | 6/2021 | Kosuge et al. | |
| 2021/0200128 | A1* | 7/2021 | Seto | B41J 11/002 |
| 2021/0245526 | A1 | 8/2021 | Mizushima | |

FOREIGN PATENT DOCUMENTS

| | | | | |
|---|---|---|---|---|
| JP | 2010-076907 | A | 4/2010 | |
| JP | 2012-213865 | A | 11/2012 | |
| JP | 2013-208781 | A | 10/2013 | |
| JP | 2014-083762 | A | 5/2014 | |
| JP | 2016-150445 | A | 8/2016 | |
| JP | 2018-130936 | A | 8/2018 | |
| JP | 2018-165217 | A | 10/2018 | |
| JP | 2018-174519 | A | 11/2018 | |
| JP | 2019-116055 | A | 7/2019 | |
| WO | WO-2021154239 | A1 * | 8/2021 | B41J 11/0022 |

OTHER PUBLICATIONS

Jun. 4, 2024 Japanese Official Action in Japanese Patent Appln. No. 2020-100439.

* cited by examiner

IMAGE RECORDING APPARATUS WITH HEATING OF RECORDING MEDIUM ON WHICH RECORDING HAS BEEN PERFORMED AND WITH BRANCHED CONVEYING PATH

BACKGROUND OF THE INVENTION

Field of the Invention

The present invention relates to an ink-jet-system image recording apparatus, provided with a heating portion to promote drying by heating a recording medium on which ink is ejected.

Description of the Related Art

There conventionally is an ink-jet-system image recording apparatus equipped with a full-line ink-jet head that ejects ink. For example, Japanese Patent Application Publication No. 2018-130936 discloses an image recording apparatus of which a full-line ink-jet head is configured to be capable of moving among a recording position, a standby position, and a maintenance position. In this image recording apparatus, a discharge tray is disposed further above in the vertical direction than a movement path of the head so as not to interfere with the movement path of the head, and a conveying route is formed, which conveys recoding medium upward in the vertical direction from a recording portion to a discharge portion. Further above the conveying route and the discharge portion are disposed a scanner portion provided with an automatic document feeder (ADF) for reading documents automatically fed, and a flatbed scanner (FBS) that reads (scans) documents placed on a glass pane by a user. Also, U.S. Patent Application Publication No. 2018/0272752 discloses an ink-jet recording apparatus provided with a drying portion on the downstream side of the recording portion in the conveying direction, to dry a recording medium that is damp due to adhesion of ink. Drying the recording medium by the drying portion suppresses changes in physical properties and deformation, such as curling and cockling, of the recording medium, and improves alignability thereof when the recording medium is discharged, and facilitates post-processing.

SUMMARY OF THE INVENTION

In a case of adding a heating portion to the configuration disclosed in Japanese Patent Application Publication No. 2018-130936, there is a problem in that the resulting conveying route is more long in the horizontal direction depending on the layout, leading to an increased product size, and, in particular, to a larger footprint of the apparatus. Also, in a case of installing the heating portion further above in the vertical direction than the movement path of the head so as not to interfere with the movement path of the head, the position of the scanner portion disposed further above (i.e., further above the position of the heating portion) needs to be higher (i.e., higher than an original position of the scanner portion), resulting in poorer usability for placing and retrieving documents on and from the glass face. Conversely, U.S. Patent Application Publication No. 2018/0272752 does not describe placement of a heating portion, and makes no mention whatsoever of a specific configuration and placement of the heating portion to reduce footprint or to keep the glass face low.

An object of the present invention is to provide technology that enables placement of a heating portion while avoiding increase in size of the apparatus, such as a larger footprint, increase height of the apparatus, and so forth.

In order to achieve the above object, an image recording apparatus according to the present invention includes:

- a recording portion unit that records an image on a recording medium;
- a heating portion that heats the recording medium on which recording has been performed by the recording portion;
- a discharge portion unit that configured to discharge the recording medium on which recording has been performed by the recording portion unit;
- a first conveying path for conveying the recording medium from the recording portion unit to the discharge portion unit via the heating portion; and
- a heating unit configured to heat the recording medium on which recording has been performed by the recording unit and disposed on the first conveying path, and
- a second conveying path configured to branch off from the first conveying path at a branching portion between the heating unit and the discharge unit for conveying the recording medium from the recording portion to the discharge portion without passing through the heating portion,
- wherein, in a first section in which the heating portion is disposed on the first conveying path, the recording medium is guided in a direction substantially perpendicular to an installation face of the image recording apparatus, and
- wherein the second conveying path has a second section that is parallel to the first section.

According to the present invention, placement of a heating portion can be realized while avoiding increase in size of the apparatus, such as a larger footprint, increase height of the apparatus, and so forth.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
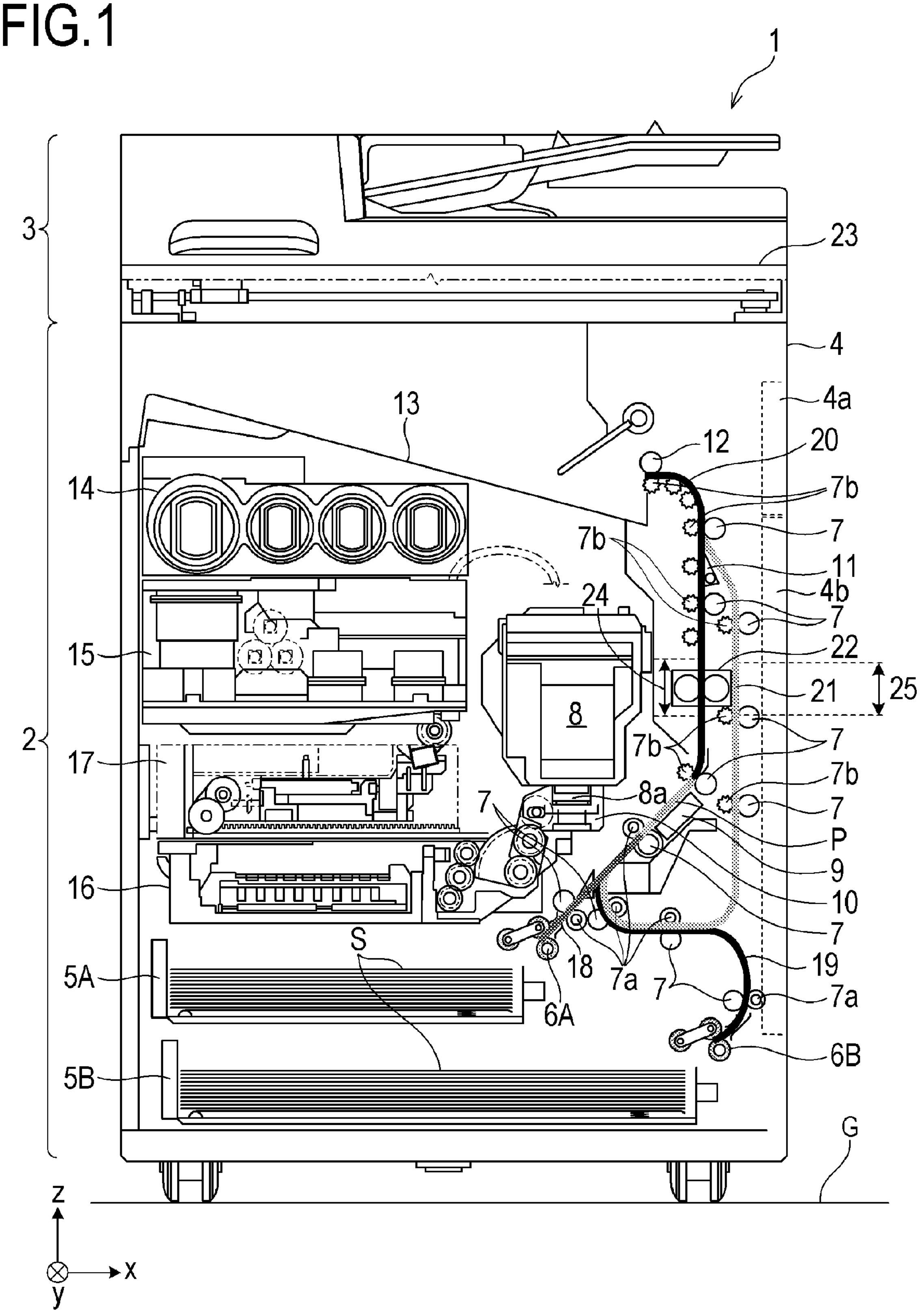
FIG. 1 is a diagram illustrating an internal configuration of an ink-jet recording apparatus according to a first embodiment (standby state)

FIG. 1 is a diagram illustrating an internal configuration of an ink-jet recording apparatus 1 (hereinafter, "recording apparatus 1") according to a first embodiment of the present invention. Hereinafter, in the Figures, the x direction represents the horizontal direction, the y direction (direction perpendicular to the plane of the Figure) represents a direction in which ejecting orifices are arrayed in a later-described recording unit 8, and the z direction represents the vertical direction.

The recording apparatus 1 is a multi-function printer (image recording apparatus) that is provided with a print portion 2 serving as an image recording portion (image recording device) and a scanner portion 3 serving as an image reading portion (image reading device). The recording apparatus 1 is capable of executing various types of processing relating to recording operations and reading operations, independently by the print portion 2 and the scanner portion 3, or by collaboration thereof. The scanner portion 3 is provided with an automatic document feeder (ADF) and a flatbed scanner (FBS), and can perform reading of documents automatically fed by the ADF, and reading (scanning) of documents placed on a glass pane of the FBS by the user. FIG. 1 illustrates a standby state, in which the recording apparatus 1 is performing neither recording operations nor reading operations.

In the print portion 2, a first cassette 5A and a second cassette 5B as stacked portions to accommodate recording medium (cut sheets) S are detachably mounted to a base portion at the bottom of a housing 4 in the vertical direction. The first cassette 5A accommodates relatively small recording medium, up to A4 size sheets, and the second cassette 5B accommodates relatively large recording medium, up to A3 size sheets, stacked flat. A first feeding unit 6A is provided near the first cassette 5A, for separating and feeding recording medium S accommodated therein, one sheet at a time. In the same way, a second feeding unit 6B is provided near the second cassette 5B. When a recording operation is performed, a recording medium S is selectively fed from one of the cassettes.

The recording unit 8 according to the present embodiment includes a full-line type color ink-jet recording head, and a carriage part upon which the recording head is mounted, and is a unit configured to be capable of movement relative to the main unit along with the recording head. A plurality of rows of ejecting orifices, which eject ink that is a liquid, in accordance with recording data, is provided in the recording head. The rows extend over an area corresponding to the width of the recording medium S, following the y direction in FIG. 1. When the recording unit 8 is in a standby position, an ejecting orifice face 8*a* of the recording unit 8 faces downward in the vertical direction as illustrated in FIG. 1, and is capped by a cap unit 10. When performing recording operations, the orientation of the recording unit 8 is changed by a later-described print controller 202 so that the ejecting orifice face 8*a* faces a platen 9.

The platen 9 is formed by a plate extending in the y direction, supporting the recording medium S on which recording operations are performed by the recording unit 8, from the rear side. Hereinafter, a region on the conveying path where the platen 9 faces the recording unit 8 will be referred to as "recording region P" (recording portion on first conveying path). Movement of the recording unit 8 from the standby position to the recording position will be described later in detail.

Also, the "recording unit 8" as used in the present embodiment includes all parts that move relative to the print portion 2 from the standby position to the recording position, along with the ejecting orifice face 8*a*.

Conveying rollers 7, a discharge roller 12, pinch rollers 7*a*, spur rollers 7*b*, and a flapper 11 make up a conveyance mechanism for guiding the recording medium S in a predetermined direction. The conveying rollers 7 are disposed at the upstream side and the downstream side of the recording region P. The conveying rollers 7 are driving rollers driven by a conveying motor that is omitted from illustration. The pinch rollers 7*a* are driven rollers that nip the recording medium S and rotate along with the conveying rollers 7. The discharge roller 12 is positioned above the housing 4 in the vertical direction within the print portion 2, and forms a discharge portion (sheet discharge portion) of a first conveying path 20. The discharge roller 12 is a driving roller disposed at the downstream side of the conveying rollers 7 and driven by a conveying motor that is omitted from illustration. The spur rollers 7*b* are disposed facing the conveying rollers 7 or the discharge roller 12 at the downstream side of the recording region P, being driven by driving of the conveying rollers 7 or the discharge roller 12, and nip and convey the recording medium S along with the conveying rollers 7 and the discharge roller 12. The flapper 11 is a member that guides the recording medium S to a later-described second conveying path 21 following recording on a first face at the time of duplex recording operations, and is driven by an actuator that is omitted from illustration. A discharge tray 13 is positioned at the highest position of the housing 4 in the vertical direction in the print portion 2, and is a tray where the recording medium S, discharged by the discharge roller 12 after recording operations are completed, is stacked and held.

The conveying path for conveying the recording medium S from the cassette to the discharge tray 13 by the above-described conveyance mechanism is classified into a first feed path 18, a second feed path 19, the first conveying path 20, and a second conveying path 21. The first feed path 18 is a conveying path from the first feeding unit 6A to upstream of the recording region P. The second feed path 19 is a conveying path from the second feeding unit 6B to upstream of the recording region P. The first conveying path 20 is a conveying path formed from downstream of the recording region P toward the discharge tray 13 positioned above the recording region Pin the vertical direction.

A heating unit 22 is disposed in a first section 24 for conveying recording medium S in the first conveying path 20 upward in the vertical direction, and forms a heating portion in the first conveying path 20. The heating unit 22 is for promoting drying of the recording medium S regarding which recording operations have been completed, by applying heat thereto, in order to suppress deformation of the recording medium S by moisture in the ink that has adhered to the recording medium S by the recording operations. Accordingly, jamming of the recording medium S on the conveying path is prevented, and the alignability at the discharge tray 13 is improved. Also, the heating unit 22 is disposed within the height occupied by the movement path of the later-described recording unit 8 from the recording position to the maintenance position. Thus, on the first conveying path 20, a configuration is made in which a conveying path length L1 from the recording region P to the heating unit 22 is in a relation of L1<L2 as to a conveying path length L2 from the heating unit 22 to the discharge roller 12. Primarily using the conveying route for heating and drying the recording medium S is assumed in the configuration of the recording apparatus 1 according to the present embodiment, and accordingly, the relation of L1<L2 can improve throughput of recording. The heating unit 22 will be described later in detail.

The second conveying path 21 in the present embodiment is a conveying path that is formed to branch at a branching portion where the flapper 11 is disposed, between the heating portion and the discharge portion on the first conveying path 20, and to merge with the first conveying path 20 at a merging portion on the upstream side of the recording region P. The second conveying path 21 includes a second section 25 that is parallel to the first section 24 having the heating unit 22 within the first conveying path 20. In the present embodiment, the second conveying path 21 is used as a reversal conveying path to reverse recording medium S following first-face recording at the time of duplex recording, to be returned to the recording portion for second-face recording.

An ink tank unit 14 stores each of four colors of ink to be supplied to the recording unit 8. An ink feed unit 15 is provided partway along a channel connecting the ink tank unit 14 and the recording unit 8, and feeds ink from the ink tank unit 14 to the recording unit 8.

A maintenance unit 16 is provided with the cap unit 10 and a wiping unit 17, which are operated at predetermined timings to perform maintenance operations of the recording unit 8. Maintenance operations will be described later in detail.

The scanner portion 3 has a glass face 23 for reading a to-be-read medium C. The scanner portion 3 is capable of being opened and closed by an unshown hinge, so that the glass face 23 is exposed. The user can set the to-be-read medium C on the glass face 23 by exposing the glass face 23. An appropriate range for the height of the glass face 23 is limited, from the perspective of ease of operability of the user placing and retrieving the to-be-read medium C.

Figure 2:
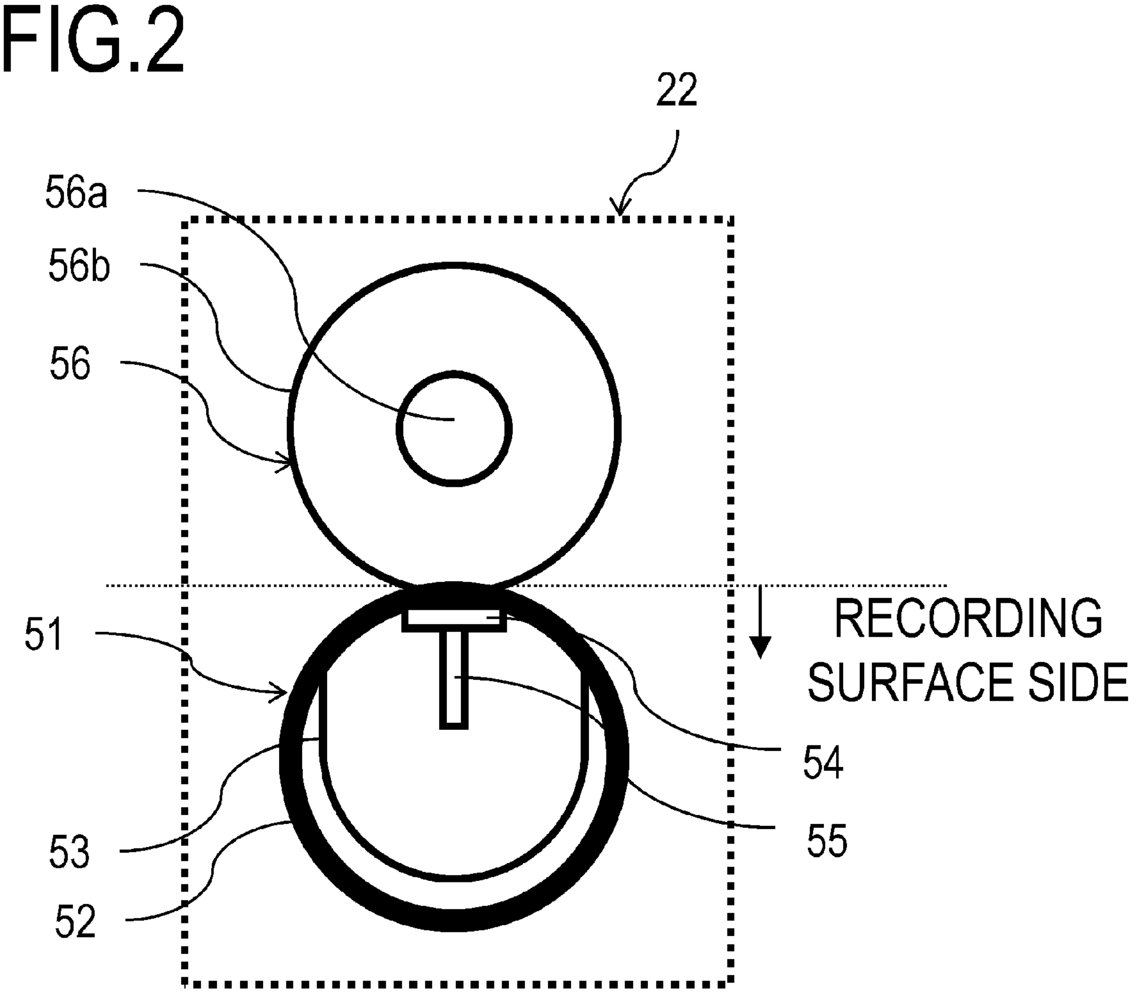
FIG. 2 is a cross-sectional view of a heating unit.

FIG. 2 is a detailed cross-sectional view of the heating unit 22 according to the present embodiment. The heating unit 22 includes a heating member 51 and a pressure roller 56, these being disposed extending in they direction so as to cover the width of the recording medium S of the largest size. The heating member 51 includes a supporting member 53 that supports a heating element 54. The heating element 54 is a ceramic heater, for example, and is disposed extending in the y direction. The temperature of the heating element 54 is detected by a temperature sensor 55 of which a thermistor is representative, and driving control of the heating element 54 is performed on the basis of the detection results. The supporting member 53 further supports a film 52. The film 52 is configured having a cylindrical form, and is disposed extending in the y direction. The film 52 is supported by the supporting member 53 so as to rotate around the supporting member 53, and is interposed between the pressure roller 56 and the heating element 54. The film 52 is a single-layer film or a multi-layer film, of which the thickness is at least 10 μm and not more than 100 μm, for example. In a case of a single-layer film, examples of the material thereof include polytetrafluoroethylene (PTFE), perfluoroalkoxy alkane (PFA), and fluorinated ethylene propylene (FEP). In a case of a multi-layer film, this is a film of a layered structure in which PTFE, PFA, FEP, or the like, covers or is coated on a layer of which examples include polyimide, polyamide imide, polyether ether ketone (PEEK), polyether sulfone (PES), polyphenylene sulfide (PPS), and so forth.

Note that the heating member 51 is not limited to the above-described configuration. For example, a structure may be made in which a heating element such as a halogen heater or the like is provided inside a hollow metal core shaft, and the perimeter of the core shaft is covered with an elastic member such as silicon rubber or the like.

The pressure roller 56 is configured by covering the circumferential face of a core **56*a* with an elastic member 56*b* such as silicon rubber or the like. The pressure roller 56 is pressed against the heating member 51 by a predetermined pressing force, with the film 52 interposed therebetween, thereby forming a nip portion between the pressure roller 56 and the film 52 by the pressure roller 56 and the heating member 51. The pressure roller 56 is rotated by a motor serving as a driving source, and the film 52 rotates following the pressure roller 56. According to this configuration, the recording medium S is heated by coming into contact with the film 52 serving as a heating member that is heated by the heating member 51**, while being conveyed at the nip portion, and thus drying of the recording medium S can be promoted.

Note that the heating unit 22 serving as a heating and drying portion is not limited to the contact heating system described in the present embodiment. For example, this may be an arrangement that promotes drying without coming into contact with the recording medium S, by blowing warm air on the recording medium S (warm air system), or by providing an infrared heater near the recording medium S (non-contact heating system).

Figure 3:
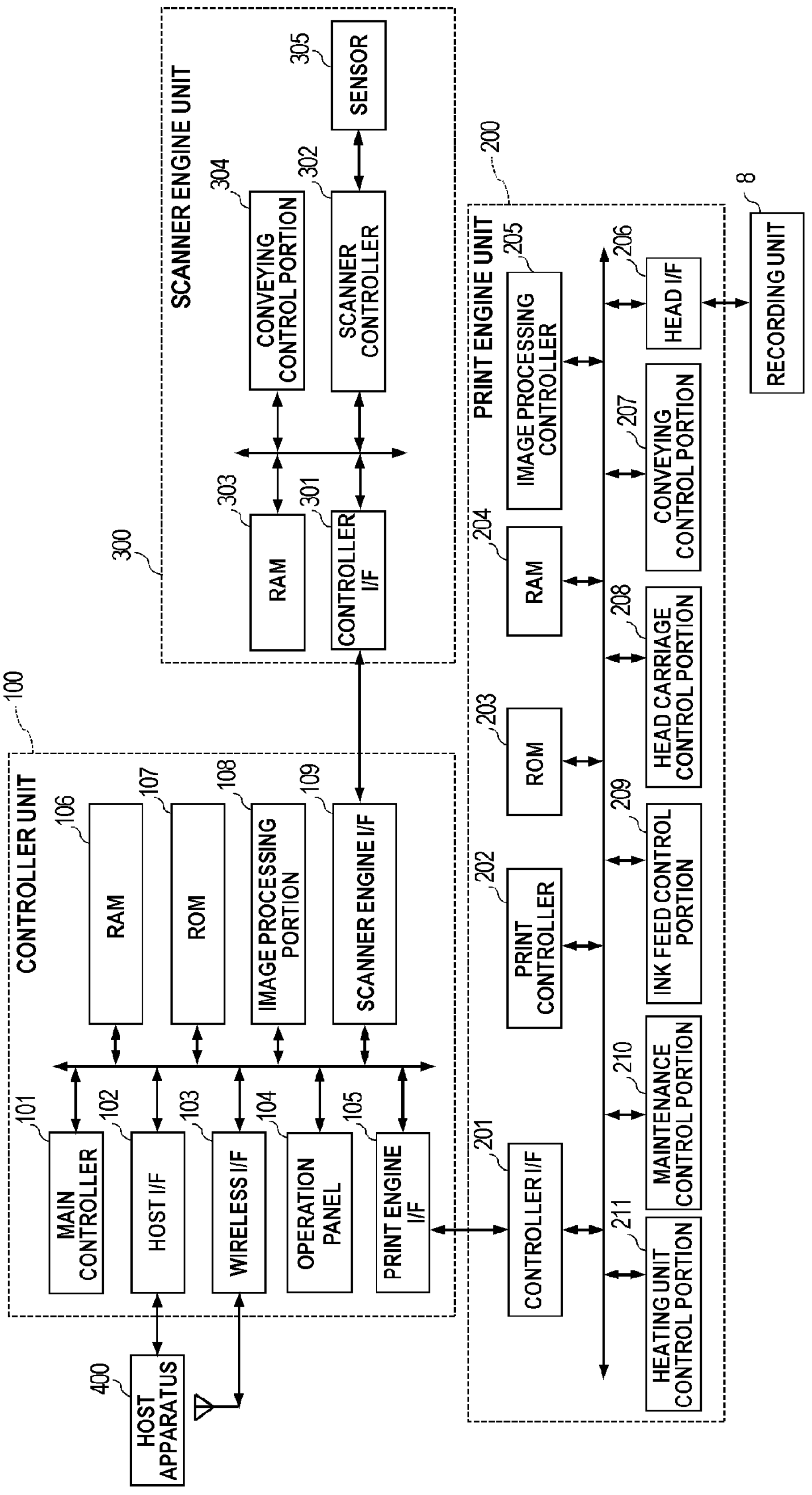
FIG. 3 is a block diagram illustrating a control configuration in the recording apparatus.

FIG. 3 is a block diagram illustrating a control configuration in the recording apparatus 1. The control configuration is primarily configured of a print engine unit 200 that governs the print portion 2, a scanner engine unit 300 that governs the scanner portion 3, and a controller unit 100 that governs the entire recording apparatus 1. The print controller 202 controls the various types of mechanisms of the print engine unit 200 under instructions from a main controller 101 of the controller unit 100. Various types of mechanisms of the scanner engine unit 300 are controlled by the main controller 101 of the controller unit 100. Details of the control configuration will be described below.

In the controller unit 100, the main controller 101 configured of a central processing unit (CPU) controls the entire recording apparatus 1 following programs and various types of parameters stored in read-only memory (ROM) 107, using random access memory (RAM) 106 as a work area. For example, when a print job is input from a host apparatus 400, via a host I/F 102 or a wireless I/F 103, an image processing portion 108 performs predetermined image processing on received image data following instructions from the main controller 101. The main controller 101 then transmits the image data subjected to image processing to the print engine unit 200, via a print engine I/F 105.

Note that the recording apparatus 1 may acquire image data from the host apparatus 400 via wireless communication or wired communication, or may acquire image data from an external storage device (universal serial bus (USB) memory or the like) connected to the recording apparatus 1. The communication system used for wireless communication or wired communication is not limited. For example, wireless fidelity (Wi-Fi) (registered trademark) and Bluetooth (registered trademark) are applicable to the communication system used for wireless communication. Also, USB and so forth are applicable to the communication system used for wired communication. Further, when a read command is input from the host apparatus 400, for example, the main controller 101 transmits this command to the scanner portion 3 via a scanner engine I/F 109.

An operation panel 104 is a mechanism for a user to perform input/output to and from the recording apparatus 1. The user can instruct operations such as copying, scanning, and so forth, set printing modes, and recognize information on the recording apparatus 1, via the operation panel 104.

In the print engine unit 200, the print controller 202 configured of a CPU controls the various mechanisms that the print portion 2 is provided with, following programs and various types of parameters stored in ROM 203, using RAM 204 as a work area. Various types of commands and image data received via a controller OF 201 are temporarily stored in the RAM 204 by the print controller 202. The print controller 202 causes an image processing controller 205 to convert saved image data into recording data, so as to be usable in recording operations by the recording unit 8.

When recording data is generated, the print controller 202 causes the recording unit 8 to execute recording operations based on the recording data, via a head OF 206. At this time, the print controller 202 drives the feeding units 6A and 6B, the conveying rollers 7, the discharge roller 12, and the flapper 11, illustrated in FIG. 1, via a conveying control portion 207, to convey the recording medium S. Recording operations are executed by the recording unit 8 synchronously with the conveying operations of the recording medium S, and printing processing is performed following instructions of the print controller 202.

A heating unit control portion 211 performs heating of the heating element 54 of the heating unit 22 and driving control of the pressure roller 56 in a case of performing heating for drying of the recording medium S. In a case of performing heating for drying of the recording medium S, heating of the heating element 54 and driving of the pressure roller 56 are performed in advance, before the recording medium S reaches the heating unit 22, for example. Whether or not to heat the recording medium S is selectable in accordance with user operations at the operation panel 104, the type of the recording medium, and so forth. That is to say, whether or not to perform heating for drying is selected in accordance with whether or not there are recording operations on the first face and the second face, the type of recording medium S, and the amount of ink ejected to the recording medium S. Examples of recording medium S not suited for heating for drying may include thermosensitive sheets such as overhead projector (OHP) film, glossy sheets that have a coated layer on the surface, adhesive envelopes, and so forth. Note that whether or not to perform heating for drying of the recording medium S is not limited to this, and can be optionally selected by the user from the operation panel 104.

A head carriage control portion 208 changes the orientation and the position of the recording unit 8 in accordance with operation states such as the maintenance state and recording state of the recording apparatus 1, and so forth. An ink feed control portion 209 controls the ink feed unit 15 so that the pressure of ink to be supplied to the recording unit 8 is within an appropriate range. A maintenance control portion 210 controls operations of the cap unit 10 and the wiping unit 17 at the maintenance unit 16 when performing maintenance operations on the recording unit 8.

In the scanner engine unit 300, the main controller 101 controls hardware resources of a scanner controller 302 following programs and various types of parameters stored in the ROM 107, with the RAM 106 as a work area. This controls the various types of mechanisms that the scanner portion 3 is provided with. For example, a document that a user has stacked to the ADF is conveyed by a conveying control portion 304 and read by a sensor 305, by the main controller 101 controlling hardware resources within the scanner controller 302 via a controller I/F 301. The scanner controller 302 then saves the image data that has been read in RAM 303. Note that the print controller 202 is capable of causing the recording unit 8 to execute recording operations on the basis of the image data read by the scanner controller 302, by converting the image data acquired as described above into recording data.

Orientation Change of Recording Unit 8

Figure 4:
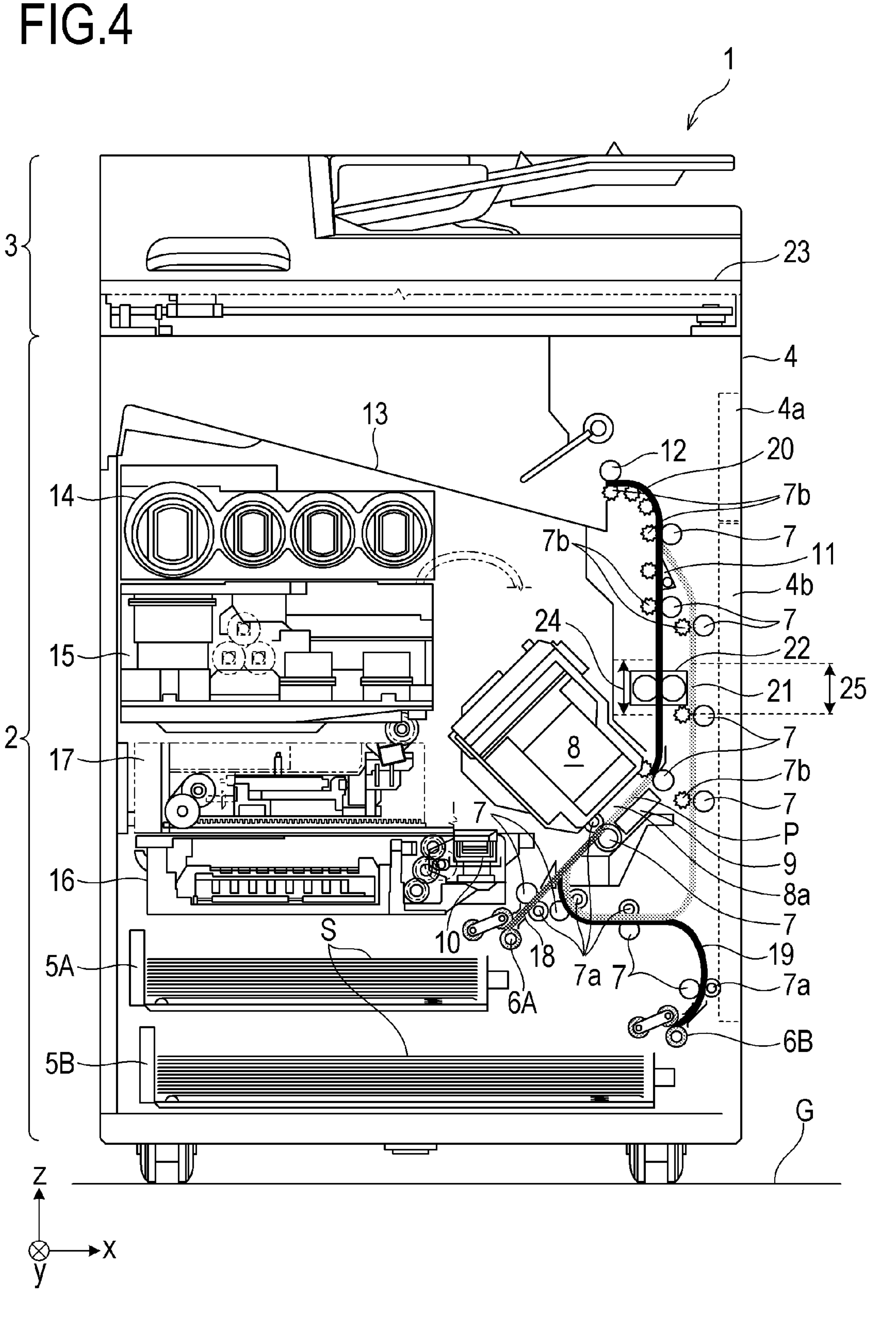
FIG. 4 is a diagram illustrating an internal configuration of the ink-jet recording apparatus according to the first embodiment (recording state)

FIG. 4 illustrates the recording apparatus 1 when in the recording state. Compared with the standby state illustrated in FIG. 1, the cap unit 10 is distanced from the ejecting orifice face 8*a* of the recording unit 8, and the ejecting orifice face 8*a* is facing the platen 9. In the present embodiment, the plane of the platen 9 is inclined approximately 45 degrees as to the horizontal direction, and the ejecting orifice face 8*a* of the recording unit 8 at the recording position is inclined approximately 45 degrees as to the horizontal direction, so that the distance as to the platen 9 is maintained at a predetermined value.

When moving the recording unit 8 from the standby position illustrated in FIG. 1 to the recording position illustrated in FIG. 4, the print controller 202 uses the maintenance control portion 210 to cause the cap unit 10 to descend to a retracted position illustrated in FIG. 4. Thus, the ejecting orifice face 8*a* of the recording unit 8 is distanced from a cap member 10*a*. Thereafter, the print controller 202 uses the head carriage control portion 208 to rotate the recording unit 8 45 degrees while adjusting the height of the recording unit 8 in the vertical direction, so that the ejecting orifice face 8*a* faces the platen 9. When the recording operation is completed and the recording unit 8 moves from the recording position to the standby position, a process opposite to that above is performed by the print controller 202.

The driving mechanism for changing the position (orientation) of the recording unit 8 to the standby state, the maintenance state, or the recording state is not limited to a particular arrangement, and conventionally-known configurations may be used as appropriate. One example is a configuration in which guide grooves that retain and guide to-be-guided portions at both longitudinal ends of the recording unit 8 are provided in the housing 4 of the recording apparatus 1, with the recording unit 8 moving along guiding paths defined by the guide grooves. The driving force for moving the recording unit 8 can be provided, for example, by a configuration in which a cam-shaped moving portion rotatably provided at the apparatus main unit side coming into contact with a to-be-moved portion of the recording unit 8, with a motor serving as a driving force source rotationally driving the moving portion. The recording unit 8 can be moved following the guide grooves, by rotation of the moving portion by the motor changing the amount of the moving portion pressing the to-be-moved portion. Also, the change in angle (change in orientation) of the recording unit 8 between the recording position and the standby position can be realized by a configuration in which the to-be-guided portion is guided in the guiding direction of the guide groove while changing the angle thereof. Alternatively, this can be realized by providing the recording unit 8 with rotational force that rotates the to-be-guided portion in the guide groove, at the end of the guide route. Such rotating operations can be realized by innovating the form in which the to-be-guided portion and the guide groove are engaged, or alternatively by disposing a protruding portion that creates a start point for rotation by this protruding portion abutting the recording unit 8 partway through guiding, for example.

Conveying Route of Recording Media

Next, the conveying route of the recording medium S in the print portion 2 will be described. Upon a recording command being input, the print controller 202 first uses the maintenance control portion 210 and the head carriage control portion 208 to move the recording unit 8 to the recording position illustrated in FIG. 4. The print controller 202 also uses the heating unit control portion 211 to perform heating of the heating member 51 and driving of the pressure roller 56 in the heating unit 22, to achieve a state in which the recording medium can be heated. Thereafter, the print controller 202 uses the conveying control portion 207 to drive one of the first feeding unit 6A and the second feeding unit 6B following recording commands, and feeds the recording medium S.

In a case in which the first feeding unit 6A is operated, the topmost recording medium S stacked in the first cassette 5A is separated from the second and subsequent recording medium by the first feeding unit 6A. The recording medium S is then conveyed over the first feed path 18 toward the recording region P, being nipped by the conveying rollers 7 and the pinch rollers 7*a*. In a case in which the second feeding unit 6B is operated, the topmost recording medium S stacked in the second cassette 5B is separated from the second and subsequent recording medium by the second feeding unit 6B. The recording medium S is then conveyed over the second feed path 19 toward the recording region P, being nipped by the conveying rollers 7 and the pinch rollers 7*a*.

In the recording region P, ink is ejected from a plurality of ejecting orifices provided to the ejecting orifice face 8*a* of the recording unit 8 toward the recording medium S. The rear face of the recording medium S in the region where ink is imparted is supported by the platen 9, and the distance between the ejecting orifice face 8*a* and the recording medium S is maintained at a constant distance. The recording medium S, following imparting of ink is guided over the first conveying path 20 by the conveying rollers 7 and the spur rollers 7*b*, is conveyed upward in the vertical direction through the first section 24 within the first conveying path 20, and enters the heating unit 22. The recording medium S to which ink has been imparted is in a state in which drying is promoted, due to passing through the heating unit 22.

At this time, when the amount of time from the recording medium S being imparted with ink to entering the heating unit 22 is short, the recording medium S is nipped by the heating unit 22 in a state in which ink is not fully permeated into the recording medium S and remains as liquid ink on the surface. This may result in ink being transferred and adhering to the film 52 of the heating unit 22. Ink adhering to the film 52 can be retransferred to the recording medium S, leading to image contamination. Conversely, when the amount of time from the recording medium S being imparted with ink to entering the heating unit 22 is long, ink is excessively permeated into the recording medium S, and only the permeated portions become bloated, resulting in deformation in which the side of the recording medium S to which ink has been imparted becomes undulated. Nipping at the heating unit 22 in this state in which such deformation has occurred leads to creasing or bending of the recording medium S. In order to avoid such problems, the print controller 202 determines the image instructed by recording commands at the image processing controller 205, and appropriately controls the convey time from the recording region P to passing the heating unit 22 using the conveying control portion 207. For example, a predetermined range of preferable conveyance time is set on the basis of information, such as the type of recording medium S and ink, the image information recorded on the recording medium S (amount of ink adhered), and so forth, and performs control so that the conveyance time is within that time range.

After passing the heating unit 22, the recording medium S passes the left side of the flapper 11 of which the tip is inclined to the right, and is discharged to the discharge tray 13 by the discharge roller 12 and the spur rollers 7*b*. The discharged recording medium S is held on the discharge tray 13 in a state with the face on which an image has been recorded by the recording unit 8 is facing down. In this case as well, there is concern of various types of trouble occurring when the amount of time from the recording medium S passing the heating unit 22 to being discharged to the discharge tray 13 is short. For example, the ink on the recording medium S may not be fully dried and ink may be transferred and adhered to the rear face of a recording medium discharged and stacked on the discharge tray 13 earlier, and the friction coefficient among the recording medium may increase and result in poor alignability. Accordingly, the print controller 202 determines the image instructed by recording commands at the image processing controller 205, and appropriately controls the conveyance time from passing the heating unit 22 to being discharged to the discharge tray 13 using the conveying control portion 207.

A case of performing duplex recording will be described. When recording operations on the first face by the recording unit 8 are completed, and the trailing end of the recording medium S passes the flapper 11, the print controller 202 causes the conveying rollers 7 and the discharge roller 12 to rotate in reverse, and conveys the recording medium S downward within the recording apparatus 1. At this time, the flapper 11 is controlled such that the tip thereof is inclined to the left side by an actuator that is omitted from illustration. The leading end of the recording medium S (the trailing end in recording operations of the first face) passes the right side of the flapper 11 by switchback operations including switching the flapper 11 and reverse rotation operations of the conveying rollers 7 and so forth, is guided to the second conveying path 21, and is conveyed to upstream of the recording region P again. Accordingly, the to-be-recorded face of the recording medium S is in a state of being reversed from the first face to the second face, and the second face of the recording medium S faces the ejecting orifice face 8*a* of the recording unit 8. The conveying route thereafter is the same as that of the case of the first-face recording described above. At this time, the flapper 11 is controlled by an unshown actuator so that the tip is moved to a position inclined to the right side. Note that of the plurality of conveying rollers 7 disposed along the conveying paths, the rollers that are configured to be capable of forward and reverse rotation may be only the rollers related to the above switchback operations.

Maintenance

Next, maintenance operations for the recording unit 8 will be described. The maintenance unit 16 according to the present embodiment is provided with the cap unit 10 and the wiping unit 17, which are operated at predetermined timings to perform maintenance operations, as described with reference to FIG. 1 earlier.

Figure 5:
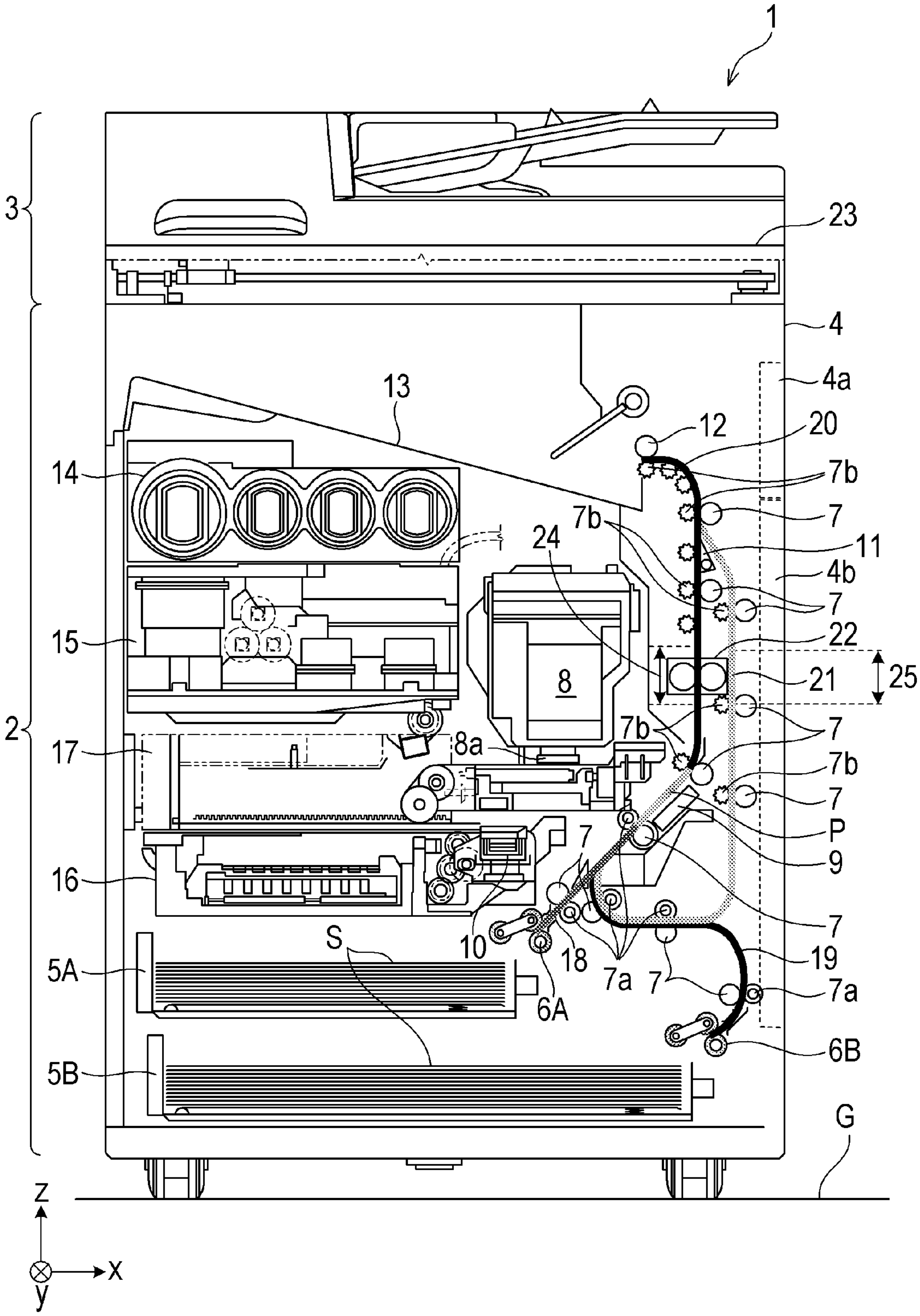
FIG. 5 is a diagram illustrating an internal configuration of the ink-jet recording apparatus according to the first embodiment (maintenance state)

FIG. 5 is a diagram illustrating the recording apparatus 1 in the maintenance state. When moving the recording unit 8 from the standby position illustrated in FIG. 1 to the maintenance position illustrated in FIG. 5, the print controller 202 moves the recording unit 8 upwards in the vertical direction, and also moves the cap unit 10 downwards in the vertical direction. The print controller 202 then moves the wiping unit 17 from a retracted position to the right direction in FIG. 5. Thereafter, the print controller 202 moves the recording unit 8 downwards in the vertical direction, to the maintenance position where maintenance operations can be performed.

Meanwhile, at the time of moving the recording unit 8 from the recording position illustrated in FIG. 4 to the maintenance position illustrated in FIG. 5, the print controller 202 moves the recording unit 8 upward in the vertical direction while the print controller 202 rotates the recording unit 8 45 degrees. The print controller 202 then moves the wiping unit 17 from the retracted position to the right direction. Thereafter, the print controller 202 moves the recording unit 8 downward in the vertical direction, to be moved to the maintenance position where maintenance operations by the maintenance unit 16 can be performed.

Figure 6A:
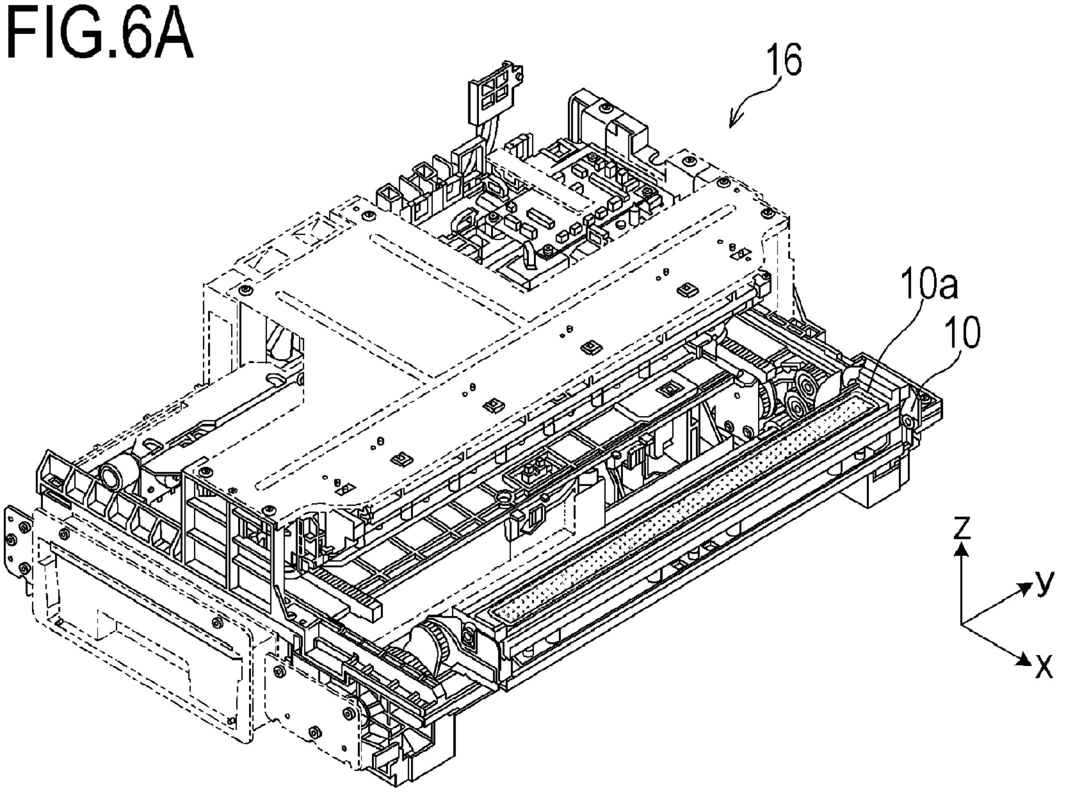
FIGS. 6A and 6B are perspective views of a maintenance unit.
Figure 6B:
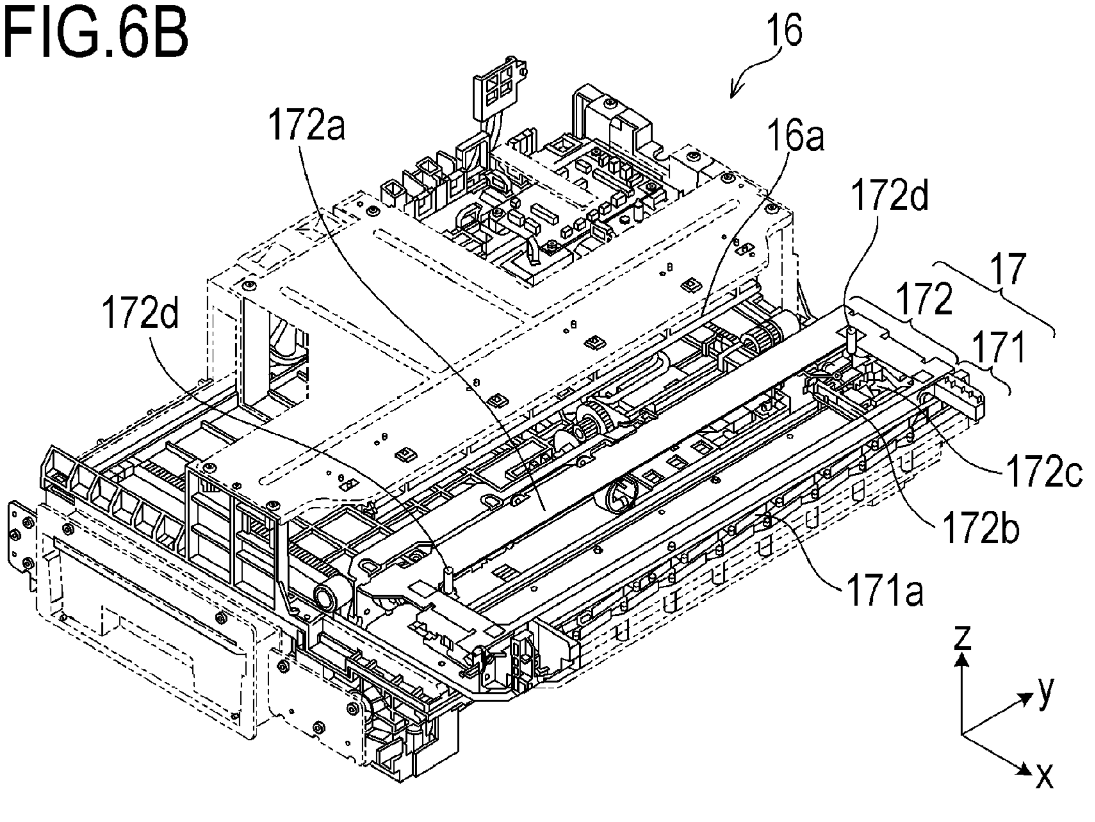

FIG. 6A is a perspective view illustrating a state in which the maintenance unit 16 is at a standby position, and FIG. 6B is a perspective view illustrating a state in which the maintenance unit 16 is at a maintenance position. FIG. 6A corresponds to FIG. 1, and FIG. 6B corresponds to FIG. 5. When the recording unit 8 is at the standby position, the maintenance unit 16 is at the standby position illustrated in FIG. 6A, with the cap unit 10 moved upward in the vertical direction, and the wiping unit 17 stored within the maintenance unit 16. The cap unit 10 has the box-shaped cap member 10*a* that extends in the y direction, which, when brought into close contact with the ejecting orifice face 8*a* of the recording unit 8, can suppress evaporation of ink from the ejecting orifices. The cap unit 10 also has a function of recovering ink ejected in preliminary ejection and so forth in the cap member 10*a*, and causing an unshown suction pump to suction the recovered ink.

In comparison, at the maintenance position illustrated in FIG. 6B, the cap unit 10 has moved downward in the vertical direction, and the wiping unit 17 is drawn out from the maintenance unit 16. The wiping unit 17 has two wiper units, which are a blade wiper unit 171 and a vacuum wiper unit 172.

The blade wiper unit 171 has a blade wiper 171*a* for wiping the ejecting orifice face 8*a* along the x direction, disposed extending in the y direction over a length equivalent to the region in which the ejecting orifices are arrayed. At the time of performing wiping operations using the blade wiper unit 171, the wiping unit 17 moves the blade wiper unit 171 in the x direction in a state in which the recording unit 8 is positioned at a height enabling contact with the blade wiper 171*a*. This movement wipes away ink and so forth adhering to the ejecting orifice face Baby the blade wiper 171*a*.

A wet wiper cleaner 16*a* for removing ink adhering to the blade wiper 171*a* and also for applying a wetting liquid to the blade wiper 171*a* is provided at the entrance of the maintenance unit 16 when the blade wiper 171*a* is stored. The blade wiper 171*a* has matter adhered thereto removed and the wetting liquid coated thereupon by the wet wiper cleaner 16*a*, each time being stored in the maintenance unit 16. The wetting liquid is then transferred to the ejecting orifice face 8*a* when the blade wiper 171*a* wipes the ejecting orifice face 8*a*, thereby improving slidability between the ejecting orifice face 8*a* and the blade wiper 171*a*.

Also, the vacuum wiper unit 172 has a plate 172*a* that has an opening portion extending in the y direction, a carriage 172*b* movable through the opening portion in the y direction, and a vacuum wiper 172*c* mounted on the carriage 172*b*. The vacuum wiper 172*c* is arranged to be capable of wiping the ejecting orifice face 8*a* in the y direction along with the movement of the carriage 172*b*. A suction opening connected to an unshown suction pump is formed on the distal end of the vacuum wiper 172*c*.

Accordingly, when the carriage 172*b* is moved in the y direction while the cap unit 10 runs the suction pump, ink and the like adhering to the ejecting orifice face 8*a* of the recording unit 8 is suctioned into the suction opening while being wiped up by the vacuum wiper 172*c*. At this time, positioning pins 172*d* provided at both ends of the opening portion of the plate 172*a* are used for positioning the ejecting orifice face 8*a* as to the vacuum wiper 172*c*.

Figure 7:
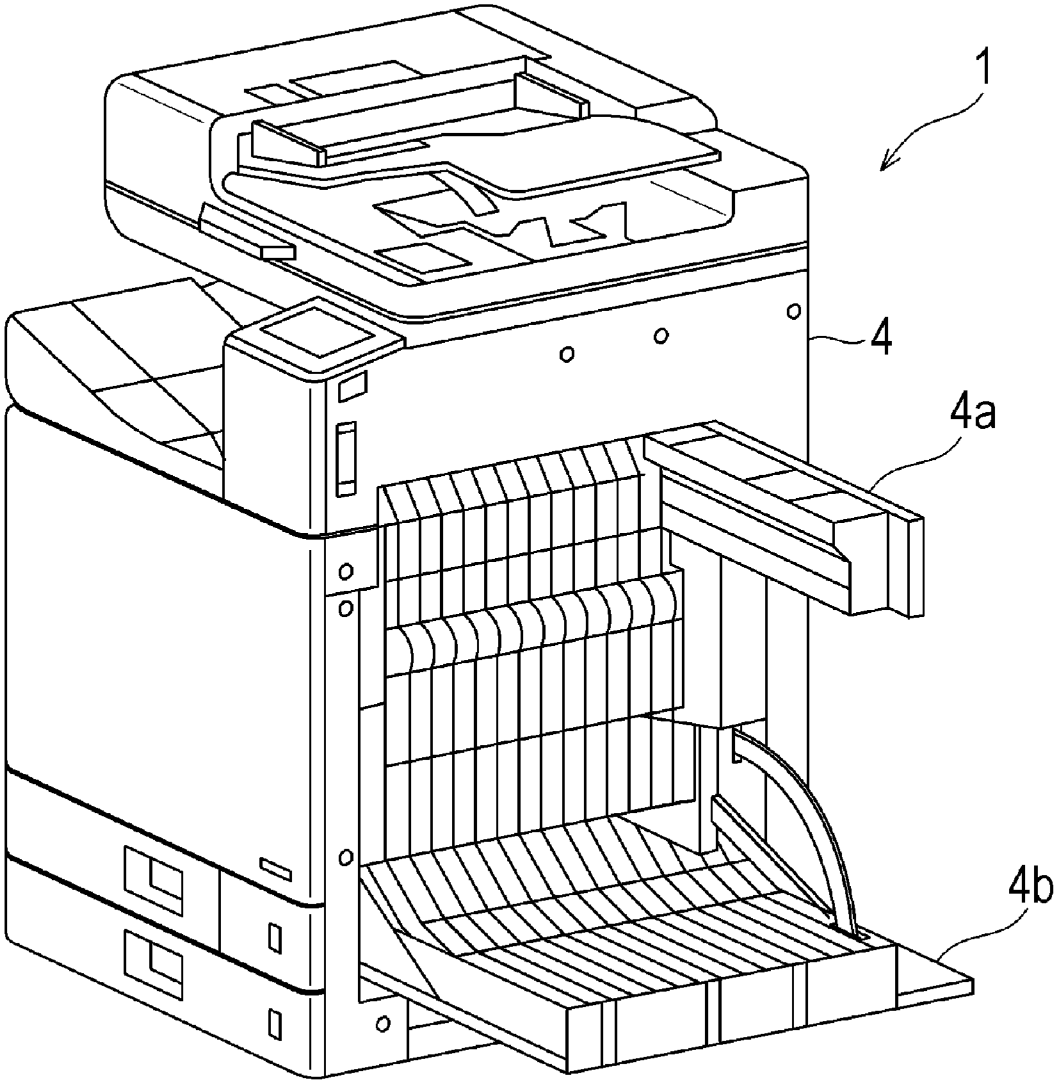
FIG. 7 is a diagram illustrating an internal configuration of the ink-jet recording apparatus according to the first embodiment (in state with exterior door open)

FIG. 7 is a perspective view illustrating the recording apparatus 1 in a state where cover doors 4*a* and 4*b* are open for jammed paper removal processing and maintenance of the conveying path. The housing 4 has the cover doors 4*a* and 4*b* on part of the exterior, to serve as opening/closing portions. The cover door 4*a* is configured to be opened and closed by pivoting on a rotation axis extending in the vertical direction perpendicular to an installation face G, primarily to externally expose the periphery of the discharge portion. The cover door 4*b* is configured to be opened and closed by pivoting on a rotation axis parallel to the installation face G, primarily to externally expose the rear side of the second conveying path 21. In a case where, during the recording operation, the recording medium S becomes jammed during printing at the recording region P, either during conveying over the first conveying path 20 after recording (regardless of whether upstream or downstream of the heating unit 22), or during conveying over the second conveying path 21, for example, the recording medium S needs to be removed. In this case, the recording operations are interrupted, each of the cover doors 4*a* and 4*b* is opened to externally expose the relevant conveying path, respectively, and both of the first conveying path 20 and the second conveying path 21 are opened. The user then accesses the location where the recording medium S is jammed and removes the jammed recording medium S, closes the cover doors 4*a* and 4*b*, and resumes recording operations. At this time, according to the present embodiment, in a case where the first conveying path 20, the second conveying path 21, the recording region P, the discharge roller 12, and so forth, are concentrated on the right side of the print portion 2 in FIG. 1 and other Figures, almost all conveying paths can be exposed just by opening the cover doors 4*a* and 4*b* on the right-side face. Accordingly, removal of the recording medium S jammed in the conveying path can be performed by opening and closing the cover doors 4*a* and 4*b* once, and the user has to perform only a few operations.

Also, there are cases where some of the ink ejected from the ejecting orifice face 8*a* of the recording unit 8 does not adhere to the recording medium S but becomes mist-like ink droplets (hereinafter, "mist") floating about in the recording region P. The mist generated here adheres along the first conveying path 20 from the recording region P to the heating unit 22, due to airflow generated by conveying of the recording medium S. At the heating unit 22, the recording medium S is nipped over the entire face thereof in the width direction, and accordingly there is no floating movement of the mist to the downstream side of the heating unit 22 due to being shielded by the recording medium S. That is to say, the heating unit 22 suppresses movement of mist along the conveying direction. When adhered mist accumulates, retransfer to the recording medium S may occur, leading to problems such as poorer image quality, and so forth. Accordingly, there is a need for the user to periodically, or at a point when poorer image quality is recognized, open the cover doors and externally expose the first conveying path 20 from the recording region P to the heating unit 22, and perform predetermined maintenance work. This work is to remove the adhered mist with a damp cloth or a specialized maintenance cloth, for example. At this time, in a configuration in which the conveying path length L1 from the recording region P to the heating unit 22 is short, as in the present embodiment, the conveying path length for maintenance by the user is short.

Comparative Example

Figure 8:
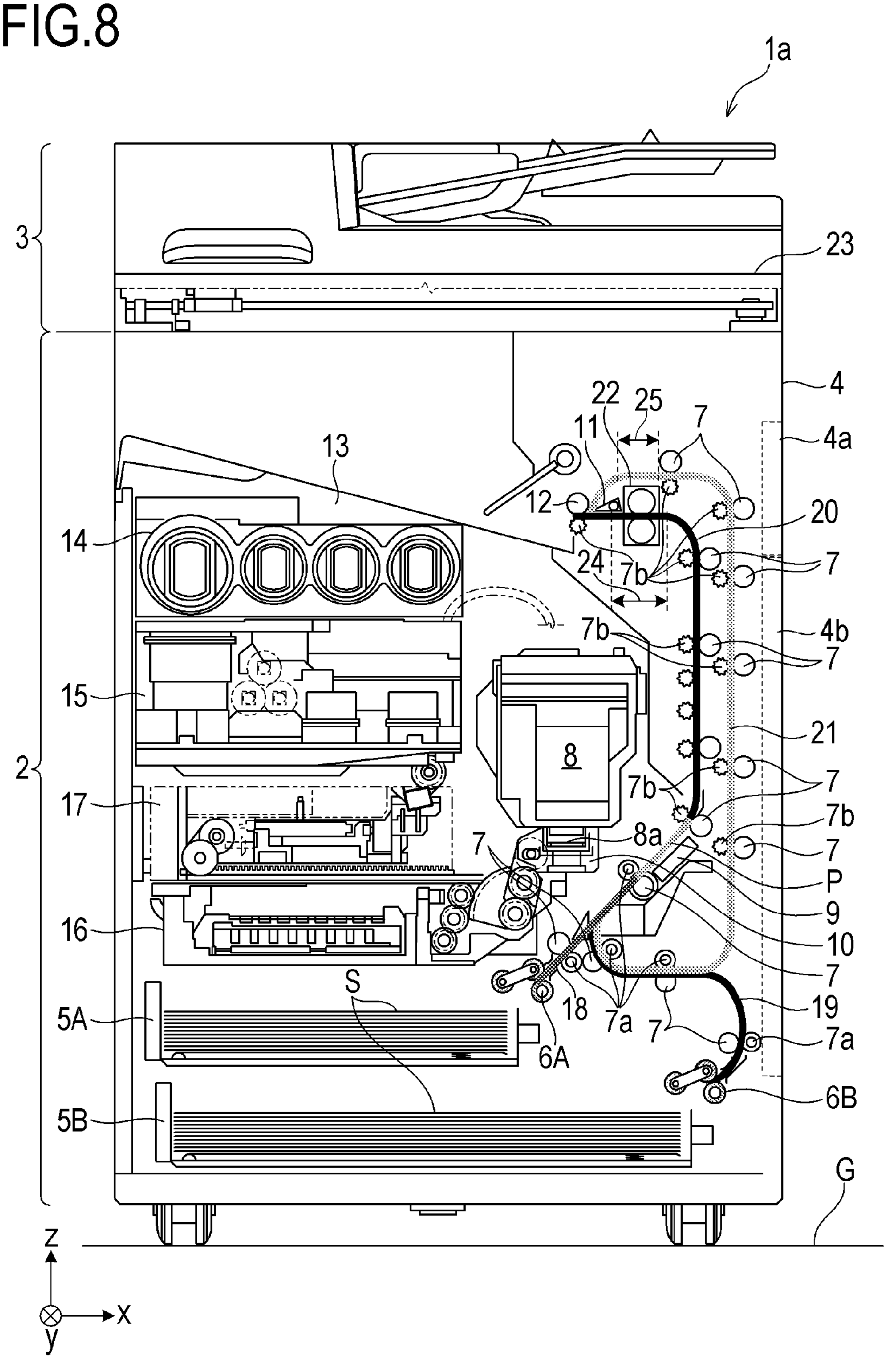
FIG. 8 is a diagram illustrating an example of an internal configuration of an ink-jet recording apparatus according to a comparative example.

FIG. 8 is a diagram illustrating an internal configuration of a recording apparatus 1*a* according to a comparative example of the first embodiment of the present invention. The recording apparatus 1*a* differs from the recording apparatus 1 according to the first embodiment with regard the position at which the heating unit 22 is disposed.

The recording unit 8 moves among the recording position, the standby position, and the maintenance position, and accordingly other parts cannot be disposed at positions that would interfere with the movement path thereof. Thus, regardless of whether there is the heating unit 22 or not, there is a limit on how low the first conveying path 20, the discharge roller 12, and the discharge tray 13 can be disposed, due to layout-related restrictions of the apparatus configuration. A case will be studied in which the heating unit 22 is disposed downstream of a bent portion (curved portion) that bends (curves) to the horizontal direction, from the conveying route extending upward in the vertical direction on the first conveying path 20, toward the discharge portion, as illustrated in FIG. 8. In this case, the position of the discharge roller 12 is unchanged, and accordingly the heating unit 22 is positioned at approximately the same height as the discharge roller 12 in the vertical direction, and the second conveying path 21 needs to be laid out detouring the heating unit 22 thereabove in the vertical direction. At this time, the height of the housing 4 of the print portion 2 in the recording apparatus 1*a* according to the comparative example, is increased in the vertical direction by an amount equivalent to a space for providing the second conveying path 21, as compared to the recording apparatus 1 according to the first embodiment, and the position of the scanner portion 3 is also inevitably higher. Accordingly, the height of the glass face 23 of the scanner portion 3 where documents, which are to-be-read medium, are set, is higher, thereby reducing user operability. Further, the position of the discharge roller 12 needs to be moved to the left side (the −x direction in FIG. 8) by an amount equivalent to the added heating unit 22 as compared to the first embodiment (FIG. 1). The discharge tray 13 is also moved to the left side accordingly, and part of the discharge tray 13 protrudes from the housing 4 of the print portion 2, and the footprint increases correspondingly.

Also, the heating unit 22 of the recording apparatus 1*a* according to the comparative example illustrated in FIG. 8 is disposed outside of a height occupied by the movement path of the recording unit 8 from the recording position to the maintenance position. Accordingly, in the recording apparatus 1*a* according to the comparative example, the relation between the conveying path length L1 from the recording region P to the heating unit 22 in the first conveying path 20 and the conveying path length L2 from the heating unit 22 to the discharge roller 12 is L1>L2.

Features of Present Embodiment

Figure 9:
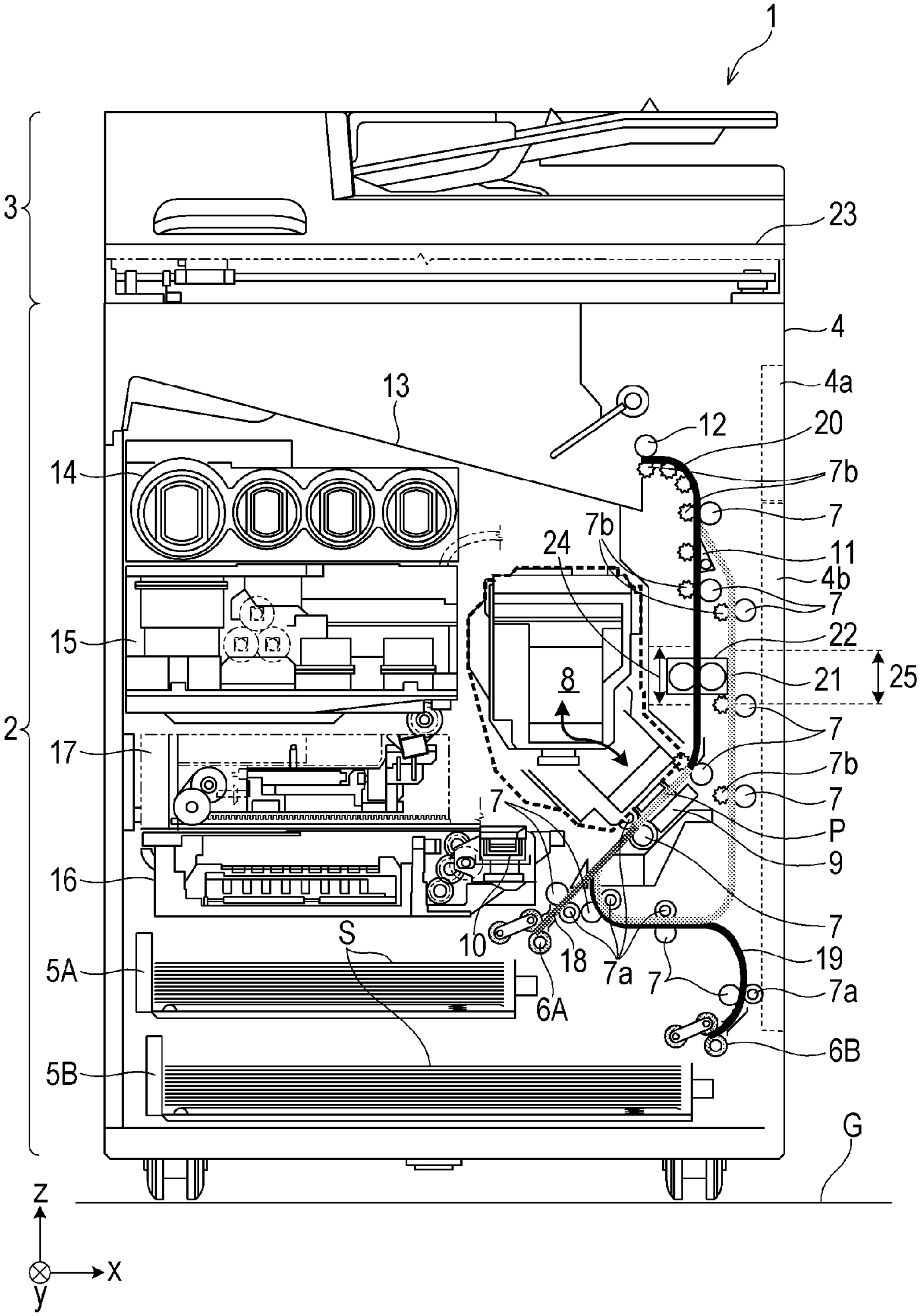
FIG. 9 is a diagram illustrating the positional relation between a recording unit and a heating unit according to the first embodiment.

FIG. 9 is a diagram illustrating the positional relation between the movement path of the recording unit 8 and the heating unit 22 in the present embodiment. The region surrounded by dashed lines in FIG. 9 is the movement path over which the recording unit 8 passes at the time of moving among the standby position/recording position/maintenance position. This movement path, the first section 24 within the first conveying path 20 (and the heating unit 22 disposed within the first section 24), and the second section 25 within the second conveying path 21, are arrayed in parallel at the same height in the vertical direction. That is to say, the first section 24 and the second section 25 are disposed within a height occupied by the movement path of the recording unit 8. According to the present configuration, in the conveying path configured of the first conveying path 20 having the heating unit 22, and the second conveying path 21 that is partly parallel to the first section 24 where the heating unit 22 is disposed, the first section 24 extends in the vertical direction. Accordingly, the x-directional positions of the discharge roller 12 and the discharge tray 13 do not have to be changed depending on whether the heating unit 22 is provided or not, as in the comparative example, and the footprint is not large. Also, there is no arrangement in which part of the heating unit 22 or the conveying path is situated at a higher position than the discharge roller 12 in the vertical direction, as in the comparative example, and accordingly the height of the print portion 2 is not high.

Further, according to the present embodiment, the heating unit 22 is disposed in the first section 24 of the first conveying path 20, in the height occupied by the movement path of the recording unit 8 from the recording position to the maintenance position. Accordingly, the conveying path length L1 from the recording region P to the heating unit 22 can be configured shorter than the conveying path length L2 from the heating unit 22 to the discharge roller 12. Thus, the length of the conveying path regarding which the user has to open the cover door and remove mist that has adhered to the conveying path at the time of maintenance can be shorter, and maintenance work can be performed easily. Also, due to the conveying path length L1 from the recording region P to the heating unit 22 being short, when the print controller 202 controls the conveying time from the recording region P to the heating unit 22 for recorded images, controlling at shorter times is enabled, thus broadening options for control contents.

Also, in the present embodiment, with regard to the heating unit 22, the film 52 serving as a heating member and the pressure roller 56 serving as a pressure member have a layout configuration of being arrayed in a direction approximately parallel to the installation face G of the recording apparatus 1 (approximately horizontal). The film 52 is situated on the same side of the conveying route of the recording medium S as the recording unit 8 to heat the recorded face of the recording medium S, i.e., on the left side in FIG. 1 and other Figures, and the pressure roller 56 is disposed to the right side in the Figures. Of the component members of the heating unit 22, at least part of the film 52 is disposed overlapping the range of the movement path of the recording unit 8 when viewing the configuration illustrated in FIG. 1 and other Figures from the vertical direction. That is to say, with regard to a necessary footprint in the direction following the installation face G (horizontal plane) of the recording apparatus 1, the film 52 out of the component members of the heating unit 22 and the recording unit 8 have a region overlapping each other. The footprint of the recording apparatus 1 can be further reduced by an amount equivalent to this overlapping region.

Particularly, the above configuration of the present embodiment can be said to be a layout configuration in which, in the configuration where the recording unit 8 performs orientation change where the angle thereof changes, part of a region that is dead space in the movement path is used for installation space of the heating unit 22. Due to this layout configuration that utilizes dead space, the size of the apparatus as to the installation face G, and the size in the height direction perpendicular to the installation face G, can be effectively suppressed.

Note that in the above description relating to the present embodiment, relations of heights among the component members are defined assuming that the installation face G of the recording apparatus 1 is a horizontal plane, but the installation face is not limited to a horizontal plane. That is to say, the recording apparatus 1 is fully capable of being used even if the installation face G has more or less of an angle as to a horizontal plane. Accordingly, in a case where the installation face G has more or less of an angle as to a horizontal plane, it is needless to say that the approximately vertical direction to the installation face that defines the height relations among the component members also has an angle in a predetermined direction as to the vertical direction in the above description.

Second Embodiment

Figure 10:
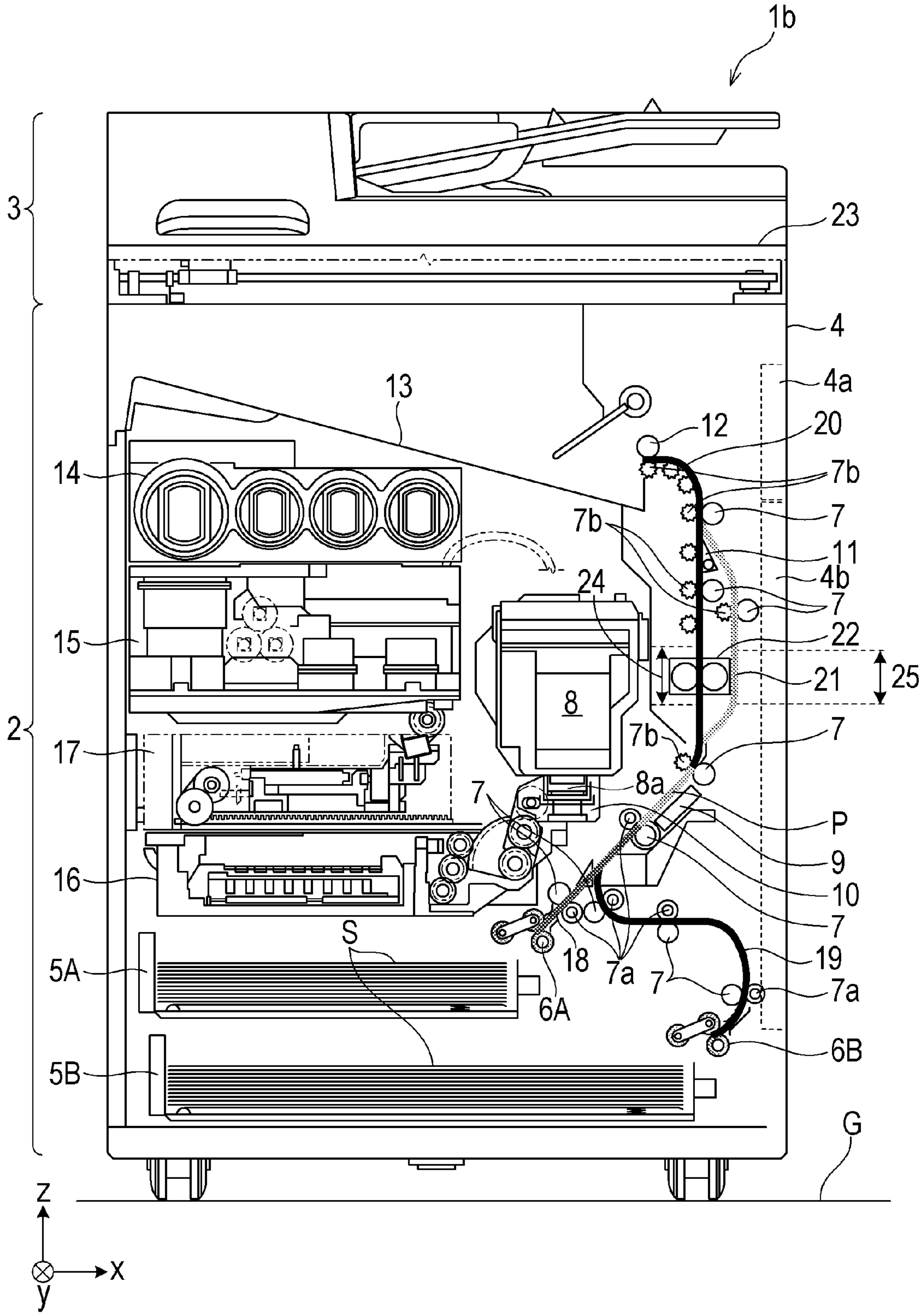
FIG. 10 is a diagram illustrating an internal configuration of an ink jet recording apparatus according to a second embodiment (recording state)

FIG. 10 is a diagram illustrating an internal configuration of a recording apparatus 1*b* according to a second embodiment of the present invention. In the second embodiment, configurations that are in common with the first embodiment are denoted by the same signs, and description thereof will be omitted. Items that are not described in particular in the second embodiment are the same as in the first embodiment.

In the recording apparatus 1 according to the first embodiment, the second conveying path 21 is provided as a return conveying path in duplex recording, but the configuration of the conveying paths is not limited to this. For example, the second conveying path 21 may be a route that branches off from the first conveying path 20 between the recording region P and the heating unit 22, and merges with the first conveying path 20 between the heating unit 22 and the discharge roller 12, as in the recording apparatus 1*b* according to the second embodiment, as illustrated in FIG. 10. In this case, the second conveying path 21 functions as a detour through which recording medium S following recording can be discharged to the discharge tray 13 without passing through the heating unit 22. According to this configuration, recording can be performed on recording medium that is not able to withstand heat, such as thermal paper, glossy paper coated with a coating material that is susceptive to heat, and so forth. Also, both the return conveying path for duplex recording and the detour for detouring the heating unit 22 may be provided. That is to say, a plurality of second conveying paths 21 may be provided.

Third Embodiment

Figure 11:
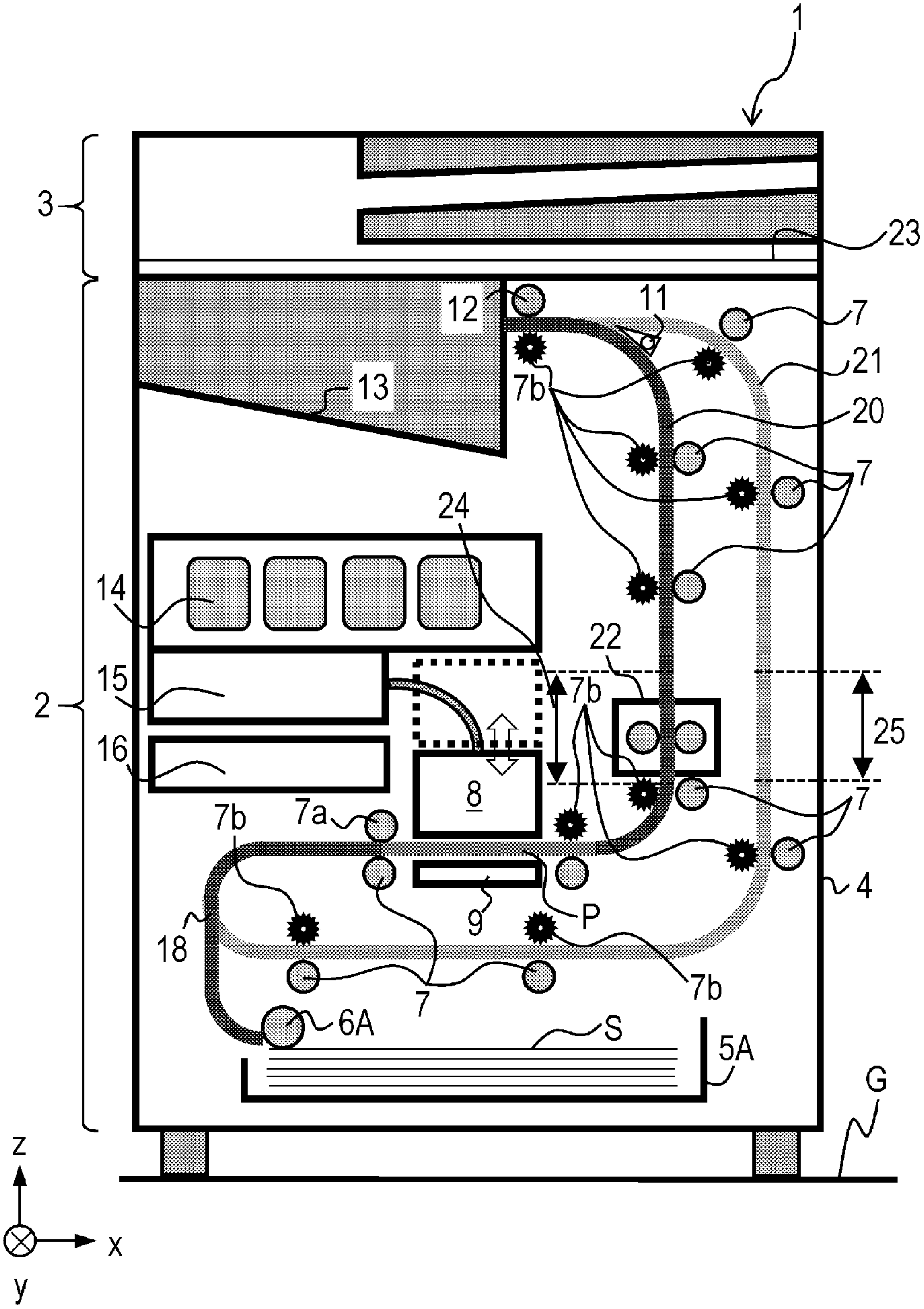
FIG. 11 is a diagram illustrating an internal configuration of an ink jet recording apparatus according to a third embodiment (recording state).

FIG. 11 is a diagram illustrating an internal configuration of a recording apparatus 1*c* according to a third embodiment of the present invention. In the third embodiment, configurations that are in common with the first and second embodiments are denoted by the same signs, and description thereof will be omitted. Items that are not described in particular in the third embodiment are the same as in the first and second embodiments.

The recording apparatus 1 according to the first embodiment has the first cassette 5A and the second cassette 5B as the two recording medium accommodation portions, but the apparatus configuration is not limited to this. For example, the number of cassettes may be just one, as in the recording apparatus 1*c* according to the third embodiment illustrated in FIG. 11. Conversely, a greater number of cassettes, such as a third cassette and a fourth cassette, may be provided. A recording apparatus may also be made that does not include cassettes as part of the configuration. In this case, a configuration may be made in which a detachably configured cassette unit is mounted later, or a configuration may be made where a manual feed tray, in which the user stacks as many sheets of the recording medium S as used that time, is provided and feeds the recording medium S.

In the recording apparatus 1 according to the first embodiment, the recording unit 8 is configured to assume an orientation inclined as to the recording position, and to move to the standby position and the maintenance position while rotating, but the configuration of the recording unit 8 is not limited to this. For example, an arrangement may be made in which the orientation of the recording unit 8 at the recording position is horizontal, and movement to the standby position and the maintenance position is just simply movement in the vertical direction, as in the recording apparatus 1*c* according to the third embodiment illustrated in FIG. 11. That is to say, movement of orientation change of the recording unit 8 is only up and down movement in the vertical direction. Also, movement of the recording unit 8 to the standby position and the maintenance position is shown in the recording apparatus 1 according to the first embodiment, but this is not limiting. For example, a configuration may be made in which movement can be performed such that the clearance distance between the platen 9 and the ejecting orifice face 8*a* of the recording unit 8 is changed, depending on the thickness of the recording medium S. Further, a configuration may be employed in which the recording unit 8 is stationary, with the platen 9 and the maintenance unit 16 being configured to move.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-100439, filed on Jun. 9, 2020, which is hereby incorporated by reference herein in its entirety.

What is claimed is:

1. An image recording apparatus comprising:

a recording unit, including an ejecting orifice face provided with an ejecting orifice that ejects liquid, that records an image on a recording medium at a recording region by ejecting liquid from the ejecting orifice on the recording medium;

a cap unit that includes a cap for capping the ejecting orifice face by moving toward the ejecting orifice face;

a discharge unit configured to discharge the recording medium on which recording has been performed by the recording unit;

a first conveying path for conveying the recording medium from the recording region to the discharge unit, the first conveying path including a first section which overlaps with the recording unit in a case of being viewed from a horizontal direction;

a heating unit configured to heat the recording medium on which recording has been performed by the recording unit and disposed in the first section;

a second conveying path configured to branch off from the first conveying path at a branching portion between the heating unit and the discharge unit and configured to merge with the first conveying path between the recording region and a stacking unit on the first conveying path; and an opening/closing unit configured to expose externally the first conveying path at least from the recording region to the heating unit in a case of a maintenance of the first conveyance path, wherein the recording unit moves between (a) a first position in which the ejecting orifice face faces the recording region and (b) a second position in which the ejecting orifice face is capped by the cap.

2. The image recording apparatus according to claim 1, wherein the recording unit includes a recording head, which includes the ejecting orifice face, that ejects liquid from the ejecting orifice onto the recording medium, and wherein the recording unit is configured to be movable in a direction perpendicular to an installation face of the image recording apparatus.

3. The image recording apparatus according to claim 2, wherein the heating unit includes (a) a heating member and (b) a pressure member that forms a nip unit with the heating member, the nip unit being formed to nip the recording medium, and wherein the heating member and the pressure member are disposed arrayed in a direction parallel to the installation face.

4. The image recording apparatus according to claim 3, wherein a heating system of the heating unit is a contact heating system in which the heating member is brought into contact with the recording medium.

5. The image recording apparatus according to claim 1, wherein, in the first conveying path, a length of a conveying route from the recording unit to the heating unit is shorter than a length of a conveying route from the heating unit to the discharge unit.

6. The image recording apparatus according to claim 1, wherein the opening/closing unit exposes at least part of the first conveying path and the second conveying path.

7. The image recording apparatus according to claim 1, wherein the second conveying path is a conveying path for (a) reversing a to-be-recorded face of a recording medium, of which a first face has been recorded on by the recording unit, and (b) conveying the recording medium upstream of the recording unit on the first conveying path.

8. The image recording apparatus according to claim 1, wherein the first conveying path has a bent portion that bends in a substantially parallel direction relative to an installation face of the image recording apparatus, toward the discharge unit downstream of the first section, and wherein the branching portion is situated upstream of the bent portion on the first conveying path.

9. The image recording apparatus according to claim 1, wherein conveyance of the recording medium is controlled on the first conveying path such that an amount of time for the recording medium that has passed the recording unit to reach the heating unit is within a predetermined range of time set on the basis of information including at least (a) a type of the recording medium and (b) information of an image to be recorded on the recording medium.

10. The image recording apparatus according to claim 1, wherein, on the first conveying path, an amount of time for the recording medium that has passed the heating unit to be discharged at the discharge unit is changed on the basis of information including at least (a) a type of the recording medium and (b) information of an image to be recorded on the recording medium.

11. The image recording apparatus according to claim 1, further comprising:

a discharge tray to which the recording medium discharged from the discharge unit is stacked, wherein the discharge tray is positioned upward of the recording unit and the heating unit.

12. The image recording apparatus according to claim 1, wherein a heating system of the heating unit is a warm air system in which warm air is blown on the recording medium.

13. The image recording apparatus according to claim 1, further comprising:

an image reading unit that reads images of a document, wherein the recording unit is capable of recording, on a recording medium, an image read by the image reading unit.

14. The image recording apparatus according to claim 13, wherein the image reading unit is positioned upward of the discharge unit.

15. The image recording apparatus according to claim 1, wherein the recording unit is a full-line type recording head.

16. The image recording apparatus according to claim 1, wherein the second conveying path includes a second section that overlaps with the first section in a case of being viewed from the horizontal direction.

17. The image recording apparatus according to claim 1, wherein the ejecting orifice face is inclined with respect to the horizontal direction in a case where the recording unit is in the first position.

18. The image recording apparatus according to claim 1, wherein an orientation of the ejecting orifice face is different between the first position and the second position.

19. The image recording apparatus according to claim 1, further comprising a wiping unit configured to wipe the ejecting orifice face, wherein the wiping unit and the cap unit move in the horizontal direction.

20. The image recording apparatus according to claim 19, wherein the cap unit is located between the ejecting orifice face and the first conveying path in a case that the wiping unit wipes the ejecting orifice face.

21. The image recording apparatus according to claim 19, wherein the recording unit moves to a third position different from the first position and the second position in a case that the wiping unit wipes the ejecting orifice face.

* * * * *